(12) United States Patent
Goral et al.

(10) Patent No.: US 8,047,603 B2
(45) Date of Patent: Nov. 1, 2011

(54) PLASTIC CRUSH COUNTERMEASURE FOR VEHICLES

(75) Inventors: Thomas M. Goral, Oakland, MI (US); Todd Korpi, South Lyon, MI (US); Eric D. Kowal, Macomb, MI (US); Prasad Satyanarayana Puvvala, Karnataka (IN)

(73) Assignee: Sabic Innovative Plastics IP B.V. (NL)

( * ) Notice: Subject to any disclaimer, the term of this patent is extended or adjusted under 35 U.S.C. 154(b) by 305 days.

(21) Appl. No.: 12/138,705

(22) Filed: Jun. 13, 2008

(65) Prior Publication Data
US 2009/0309387 A1 Dec. 17, 2009

(51) Int. Cl.
*B62D 25/00* (2006.01)
(52) U.S. Cl. .......... 296/187.03; 296/187.12; 296/193.06
(58) Field of Classification Search ............. 296/187.03, 296/187.05, 187.12, 187.13, 193.06, 193.12
See application file for complete search history.

(56) References Cited

U.S. PATENT DOCUMENTS

| | | | |
|---|---|---|---|
| 4,796,946 A * | 1/1989 | Wilson et al. ............. 296/146.6 |
| 6,092,864 A | 7/2000 | Wycech et al. | |
| 6,131,897 A | 10/2000 | Barz et al. | |
| 6,216,810 B1 * | 4/2001 | Nakai et al. ................. 180/68.4 |
| 6,273,496 B1 * | 8/2001 | Guyomard et al. ...... 296/193.09 |
| 6,311,452 B1 | 11/2001 | Barz et al. | |
| 6,412,855 B1 * | 7/2002 | Cantineau et al. ....... 296/187.01 |
| 6,419,305 B1 | 7/2002 | Larsen | |
| 6,547,317 B1 * | 4/2003 | Cheron et al. ........... 296/193.01 |
| 6,681,876 B1 * | 1/2004 | Haneda et al. .............. 180/68.4 |
| 6,715,573 B2 * | 4/2004 | Emori et al. ................. 180/68.4 |
| 6,796,604 B2 * | 9/2004 | Igura et al. ............... 296/193.03 |
| 6,851,246 B2 * | 2/2005 | Laurent .......................... 52/843 |
| 6,908,132 B2 * | 6/2005 | Bauhof ........................ 296/1.01 |
| 6,955,393 B2 * | 10/2005 | Staargaard et al. ......... 296/193.1 |
| 7,008,008 B2 * | 3/2006 | Andre et al. ............. 296/203.02 |
| 7,287,613 B2 * | 10/2007 | Kim ............................ 180/68.4 |
| 7,287,809 B2 * | 10/2007 | Andre ...................... 296/187.09 |
| 7,377,579 B2 * | 5/2008 | Kwon ...................... 296/193.09 |
| 7,879,435 B2 * | 2/2011 | Mett et al. ..................... 428/166 |
| 2003/0008105 A1 * | 1/2003 | Haack et al. ................... 428/136 |
| 2003/0159261 A1 * | 8/2003 | Kappenstein et al. ......... 29/17.1 |
| 2004/0222665 A1 * | 11/2004 | Roeth et al. .............. 296/187.01 |
| 2005/0140173 A1 * | 6/2005 | Riviere et al. ............ 296/187.01 |
| 2006/0175786 A1 * | 8/2006 | Streubel et al. ......... 280/124.134 |
| 2006/0181089 A1 * | 8/2006 | Andre et al. .................. 293/120 |
| 2008/0100096 A1 * | 5/2008 | Andre ...................... 296/187.09 |
| 2008/0116701 A1 * | 5/2008 | Boumaza et al. ............. 293/120 |
| 2008/0217960 A1 * | 9/2008 | Kochert et al. .......... 296/193.06 |
| 2009/0026806 A1 * | 1/2009 | Riviere et al. ............ 296/193.09 |
| 2009/0029122 A1 * | 1/2009 | Krause .......................... 428/198 |
| 2009/0085379 A1 * | 4/2009 | Takahashi et al. ........ 296/193.06 |

OTHER PUBLICATIONS

"Noryl GTX Profile", GE Plastics, Oct. 2001.*
"Noryl GTX modified PPO alloy PPE+PA", SABIC Innovative Plastics, 2008.*

* cited by examiner

*Primary Examiner* — Jason S Morrow
(74) *Attorney, Agent, or Firm* — Cantor Colburn LLP

(57) ABSTRACT

A plastic crush countermeasure for motor vehicles that includes a plastic insert and a reinforcement structure that provides impact and/or reinforcement characteristics and an attachment interface to the vehicle in a lighter weight structure. The crush countermeasure provides a lightweight crush system that provides comparable protection to current metal crush countermeasures using, in part, a plastic material. As such, the overall weight of a vehicle is reduced without any reduction in safety to passengers.

17 Claims, 9 Drawing Sheets

US 8,047,603 B2

PLASTIC CRUSH COUNTERMEASURE FOR VEHICLES

FIELD OF THE INVENTION

The present invention relates to vehicle crush countermeasures. More specifically, the present invention relates to plastic roof crush countermeasures that are lighter in weight than traditional crush countermeasures while providing comparable safety characteristics.

BACKGROUND OF THE INVENTION

The use of reinforcing structures in motor vehicles is known. One such example is crush countermeasures, such as roof crush countermeasures. Roof crush countermeasures are used for absorbing impact energy and protecting motor vehicle occupants in the event of a rollover event. These crush countermeasures are included within the hollow portions of a motor vehicle, such as in the roof assembly. Roof crush countermeasures, as well as other reinforcing structures, have previously been designed to provide a structure that fits within the hollow spaces to be reinforced.

In one embodiment, for hollow parts of a motor vehicle, a basic load-bearing article is used in conjunction with a foamable material. The load-bearing article serves primarily to retain the foamable material in the hollow part. Next, the hollow part is filled with foam to its full volume, and the expanded foam material provides the connection to the wall and thus the absorption of force and distribution of load. The reinforcement characteristics are based on the material properties of the foam. However, these prior art reinforcement systems require a chemical reaction that must be adapted to the production process of the vehicle, particularly in terms of the incident temperatures. The reinforcement function thus depends on accurate and constant adherence to the process parameters. Another disadvantage is that the structural parts can no longer be disconnected from one another easily, making recycling more difficult. In addition, completely filling the space with foam brings about a more or less homogeneous reinforcement effect, without the ability to take three-dimensional varying design requirements into account.

In another prior art embodiment, some crush countermeasure systems include steel stampings that are fixed to the sheet metal via thermoset adhesive. The adhesive will activate and expand as the body goes through the ovens that bake the paint. This system is not optimal. The stampings are heavy and excessive adhesive is applied to assure a solid bond from the countermeasure to the body.

Accordingly, it would be beneficial to provide a lightweight crush countermeasure that provides comparable ability to absorb impact energy and/or protecting motor vehicle occupants as metal roof crush countermeasures. It would also be beneficial to provide a crush countermeasure that may be easily manufactured and used in a motor vehicle without the use of additional processing steps.

SUMMARY OF THE INVENTION

The present invention solves one or more problems of the prior art by providing a plastic crush countermeasure that includes a plastic insert and an optional reinforcement structure. The crush countermeasure provides impact and/or reinforcement characteristics comparable to prior art metal structures, but in a lighter weight solution. The crush countermeasures of the present invention help reduce the overall weight of a motor vehicle by reducing the amount of metal used without adversely affecting the safety characteristics of the motor vehicle in the event of a rollover event.

Accordingly, in one embodiment, the present invention provides a plastic crush countermeasure that includes a plastic insert; wherein the plastic insert includes two longitudinal walls that are substantially parallel to one another and run substantially the length of the roof crush countermeasure, a plurality of reinforcement ribs connected at each end to each of the two longitudinal walls and wherein the plurality of reinforcement ribs form at least one internal X-shaped reinforcement structure, and a plurality of connections for connecting the plastic insert to the reinforcement structure.

In another embodiment, the present invention includes a method of forming a crush countermeasure that includes the steps of molding a plastic material to form a plastic insert. The plastic insert includes two longitudinal walls that are substantially parallel to one another and run substantially the length of the roof crush countermeasure, a plurality of reinforcement ribs connected at each end to each of the two longitudinal walls and wherein the plurality of reinforcement ribs form at least one internal X-shaped reinforcement structure, and a plurality of connections for connecting the plastic insert to the reinforcement structure.

BRIEF DESCRIPTION OF THE DRAWINGS

The various embodiments of the present invention can be understood by the following drawings and figures. The components are not necessarily to scale.

DETAILED DESCRIPTION OF THE INVENTION

Figure 1:
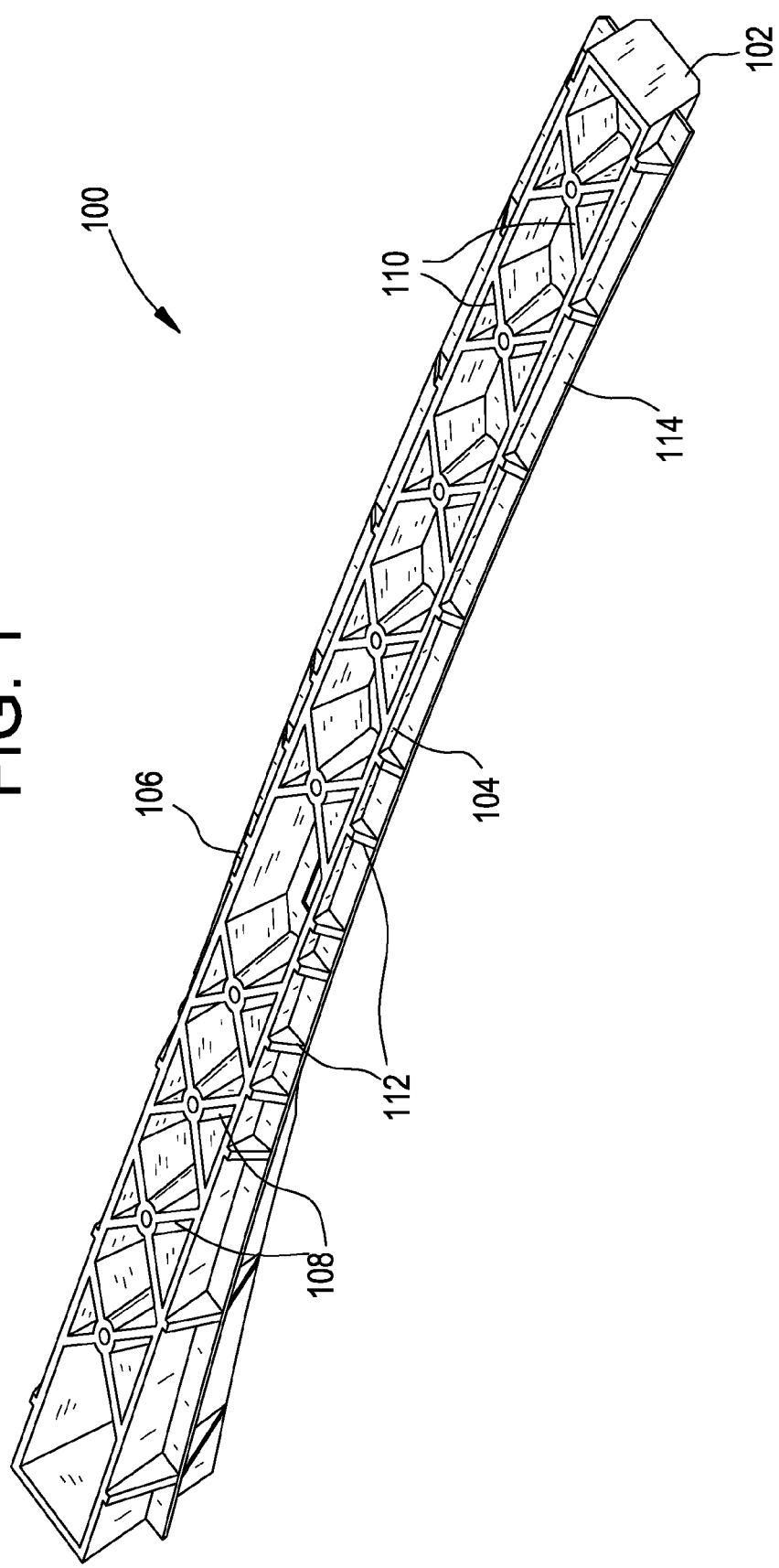
FIG. 1 is a top view of a crush countermeasure according to one embodiment of the present invention.
Figure 2:
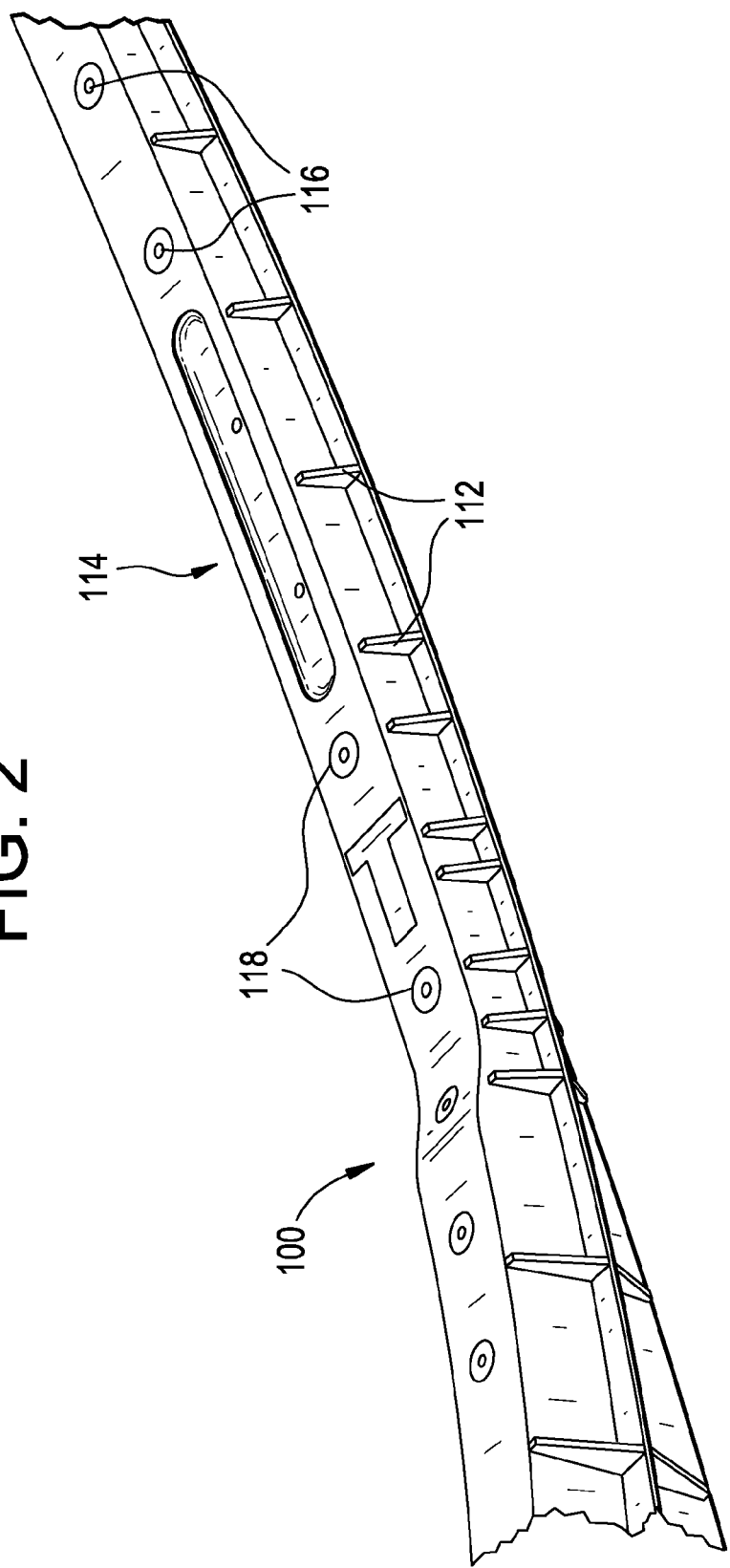
FIG. 2 is a bottom view of a crush countermeasure according to one embodiment of the present invention.
Figure 3:
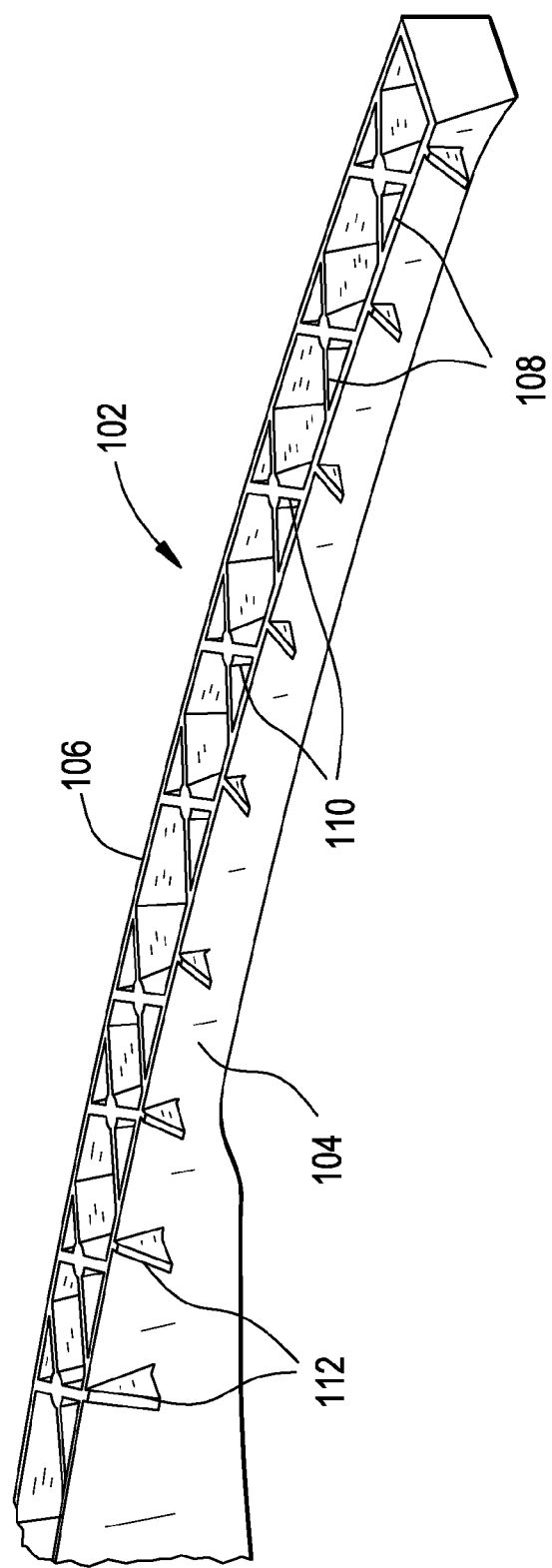
FIG. 3 is a perspective view of the plastic insert used in the crush countermeasure according to one embodiment of the present invention.
Figure 4:
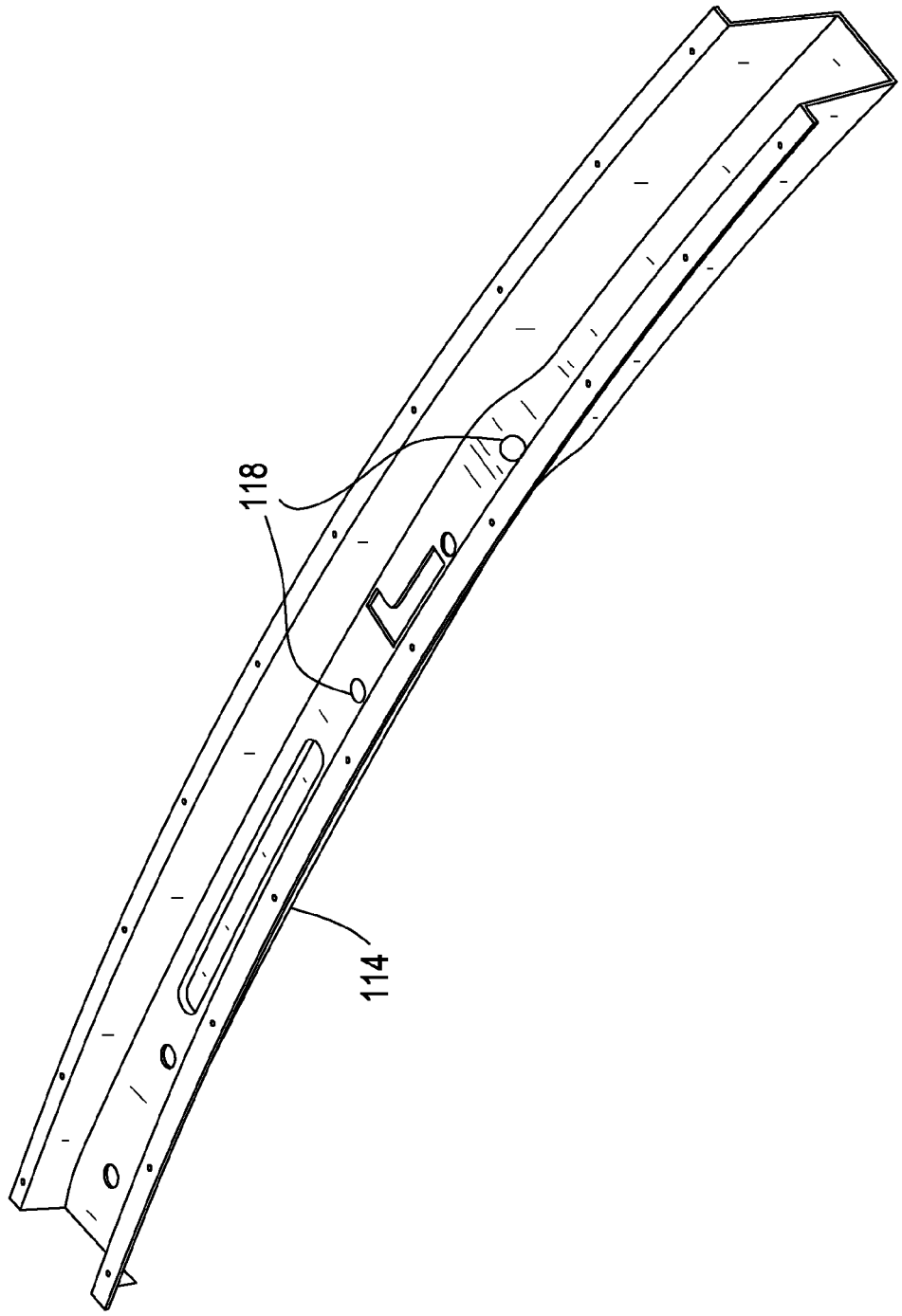
FIG. 4 is a perspective view of the reinforcing structure used in the crush countermeasure according to one embodiment of the present invention.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

The present invention provides a plastic crush countermeasure that includes a plastic insert. In an alternative embodiment, a reinforcement structure is also used in conjunction with the plastic insert. The crush countermeasure provides impact and/or reinforcement characteristics in a lighter weight structure as compared to prior art systems composed entirely of metal. The crush countermeasure provides a lightweight crush system that provides comparable protection to current metal crush countermeasures using, in part, a plastic insert. As such, the overall weight of a vehicle is reduced without any reduction in safety to passengers.

One example of a crush countermeasure according to the concepts of the present invention is a roof crush countermeasure. A "Roof Crush Countermeasure" is a structural insert for an automotive "Body-In-White", steel structure. The function of this insert is to enhance the resistance of the automotive body to roof-crushing loads at the B-Pillar. Since roof crush is the result of the vehicle rolling over onto the roof, standard testing applies a rigid wall to the roof and displaces the roof 5 inches (127 mm). This means the roof will displace 5 inches and the performance of the roof is measured by the amount of load required to obtain the displacement. As such, a roof crush countermeasure should provide impact and/or reinforcement characteristics. The roof crush countermeasures of the present invention provide these characteristics. In addition, the roof crush countermeasures of the present invention provide these characteristics while reducing the overall weight of the roof crush countermeasure.

Accordingly, in one embodiment, the present invention provides a crush countermeasure that includes a plastic insert. In another embodiment, the present invention provides a crush countermeasure that includes a plastic insert and a reinforcement structure. This crush countermeasure may be used as a structural insert in hollow areas of a motor vehicle that could benefit from a reinforcement structure such as, for example, an automotive "B"-Pillar that distributes load between the inner and outer sheet metal in the event of a roll-over roof crush.

The crush countermeasures of the present invention include a plastic insert that includes moderate stiffness, good elongation, chemical resistance and/or heat resistance up to 400 F for 30 minutes, which enables the plastic insert to maintain integrity as the part travels with the auto body through paint bake. The plastic insert may include a filled or an unfilled plastic composition. Filled plastic resins often use one or more fillers to provide impact strength to the plastic resin. However, highly glass reinforced plastics are at risk of breaking or fracturing because the 5 inch enforced displacement may bend the part beyond its elongation limit. Unfilled resins, therefore, may be used when in select embodiments when it is beneficial for the plastic resin to have a greater elongation than one provided by a glass filled version.

While the plastic insert in the crush countermeasure may be molded in segments, it is beneficial that it be of unitary construction made from a durable plastic material. Materials that are useful for molding the plastic insert of the crush countermeasure include, but are not limited to, engineering thermoplastic resins. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide, blends of polycarbonate/PET/PBT, polybutylene terephthalate, polyamides, phenylene sulfide resins, polyvinyl chloride (PVC), high impact polystyrene (HIPS), low/high density polyethylene (LDPE, HDPE), polypropylene (PP) and thermoplastic olefins (TPO), and blends thereof. In select embodiments, the plastic insert uses a blend including polyphenylene ether and polyamide.

As discussed, the plastic resin may be formed from an unfilled or a filled plastic material, depending on the selected characteristics of the plastic insert and/or the crush countermeasure. In those embodiments wherein a reinforcing filler is used, the reinforcing filler may be selected from fibers, such as carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the reinforcing fillers.

In another embodiment, the crush countermeasures of the present invention also include an over-molded reinforcement structure in conjunction with the plastic insert. As such, the crush countermeasure is, in one embodiment, created by over molding a metal reinforcement with the plastic insert to create the crush countermeasure. The plastic insert may be connected to the reinforcement structure using a plurality of different connection structures. In one embodiment, the plastic insert may include one or more connecting ribs that extend from the longitudinal walls and engage designated slots in the metal reinforcement to secure the plastic insert thereto. In another embodiment, the plastic insert may include one or more connecting tabs that are located on the bottom of the plastic insert and connect the insert to the reinforcement structure using holes designed to mate with the connecting tabs. Other means known to those of skill in the art for connecting a plastic insert to a metal reinforcement structure may also be used.

The final crush countermeasure is designed to have openings that will permit a welding tip to contact the metal reinforcement structure on the body inner and the insert to enable the roof crush countermeasure to be properly secured in the motor vehicle. In another embodiment, the metal reinforcement may include upturned flanges for stiffening the roof crush countermeasure. In an alternative embodiment, the metal reinforcement may include slots for seat belt hardware to fasten.

The foregoing and other features of the present invention will be more readily apparent from the following detailed description and drawings of the illustrative embodiments of the invention wherein like reference numbers refer to similar elements.

Referring now to FIGS. 1-5, these figures depict one embodiment of a crush countermeasure according to the inventive aspects of the present invention. In this embodiment, the crush countermeasure is a roof crush countermeasure. As can be seen, the roof crush countermeasure 100 includes a plastic insert 102 that includes two longitudinal walls 104 and 106 that run substantially parallel along the length of the plastic insert. Between the longitudinal walls are a plurality of reinforcing ribs 108, 110 that extend between the longitudinal walls 104 and 106. The reinforcing ribs are, in this embodiment, shown as forming X-shaped internal reinforcing structures between the two longitudinal walls 104 and 106. It is to be understood that other shapes for the reinforcing ribs may be used in alternative embodiments, such as H-shaped or ribs that run diagonally to the plane of the two longitudinal walls 104.

The plastic insert 102 also includes a plurality of connecting ribs 112 that extend substantially transversally from each longitudinal wall 104, 106. The connecting ribs 112 are designed to help connect the plastic insert 102 to the reinforcing structure 114, which is, in this embodiment, a steel reinforcement. As may be seen in FIG. 2, the plastic insert 102 may also use one or more projections 116 that can further help connect the plastic insert 102 to the reinforcing structure 114 using one or more holes 118 in the reinforcing structure 114.

Figure 5:
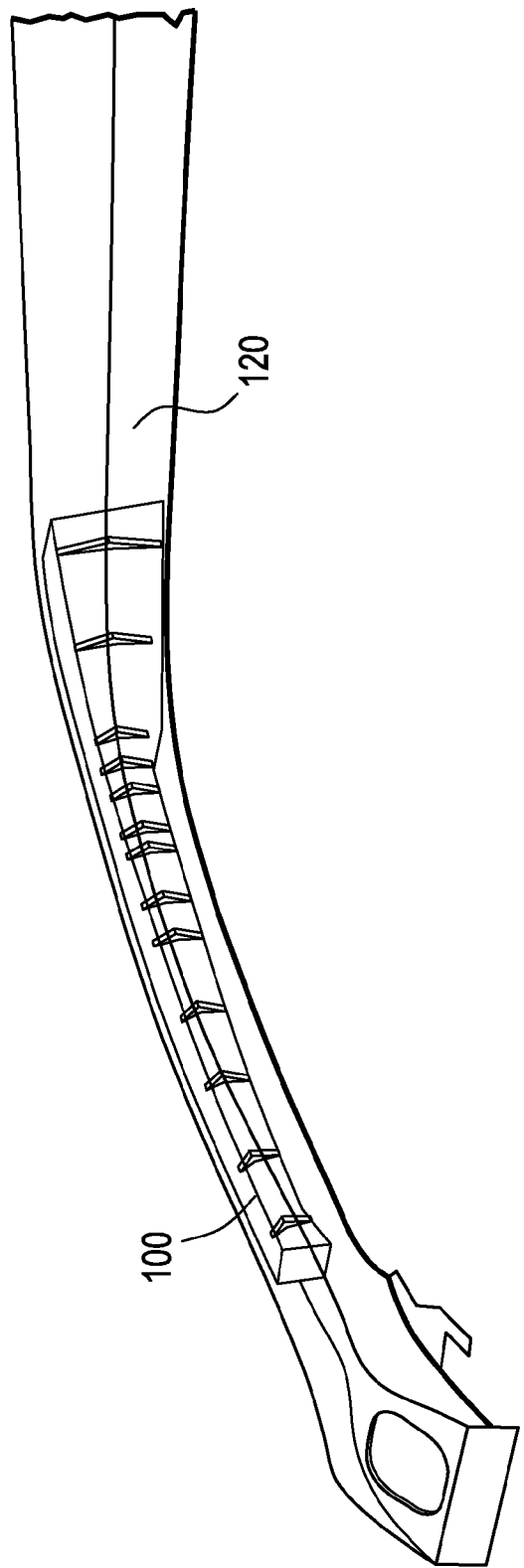
FIG. 5 is a perspective view of the crush countermeasure as used in a motor vehicle according to one embodiment of the present invention.
Figure 6:
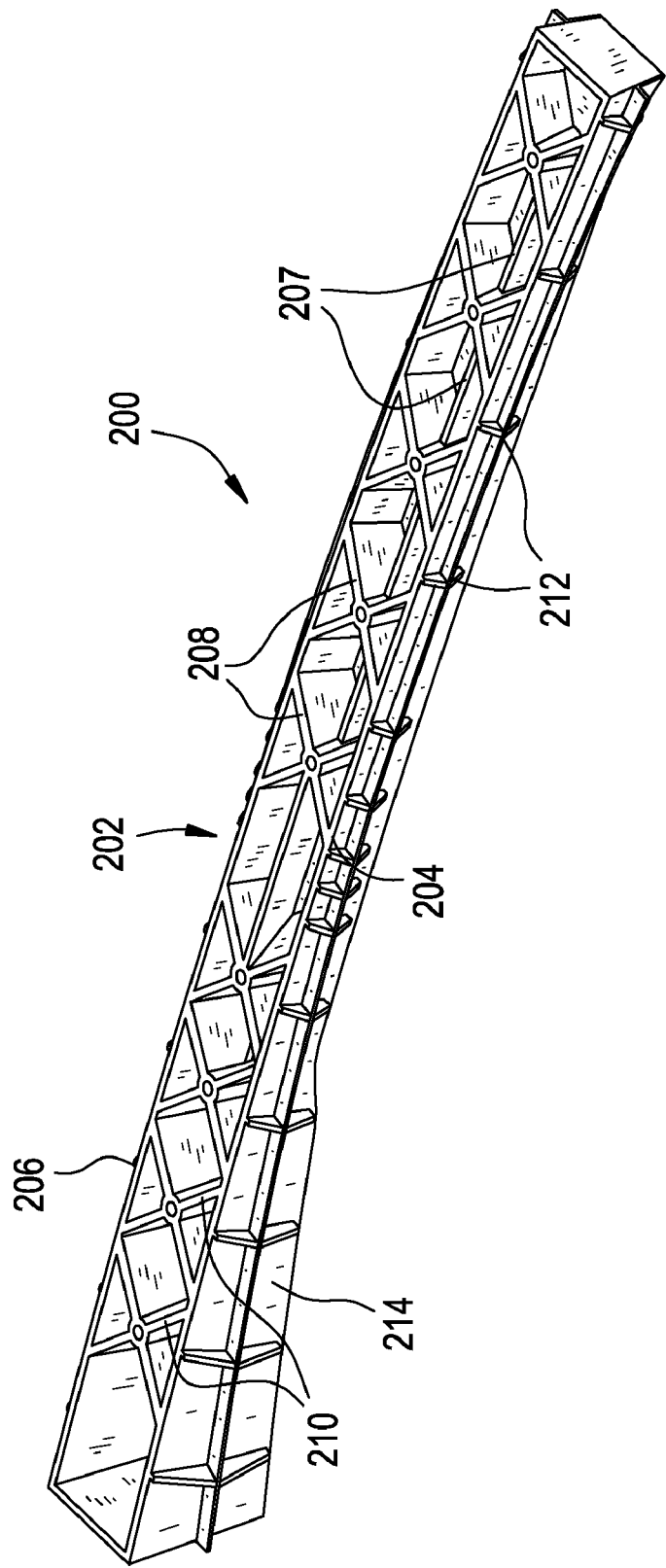
FIG. 6 is a top view of a crush countermeasure according to another embodiment of the present invention.
Figure 7:
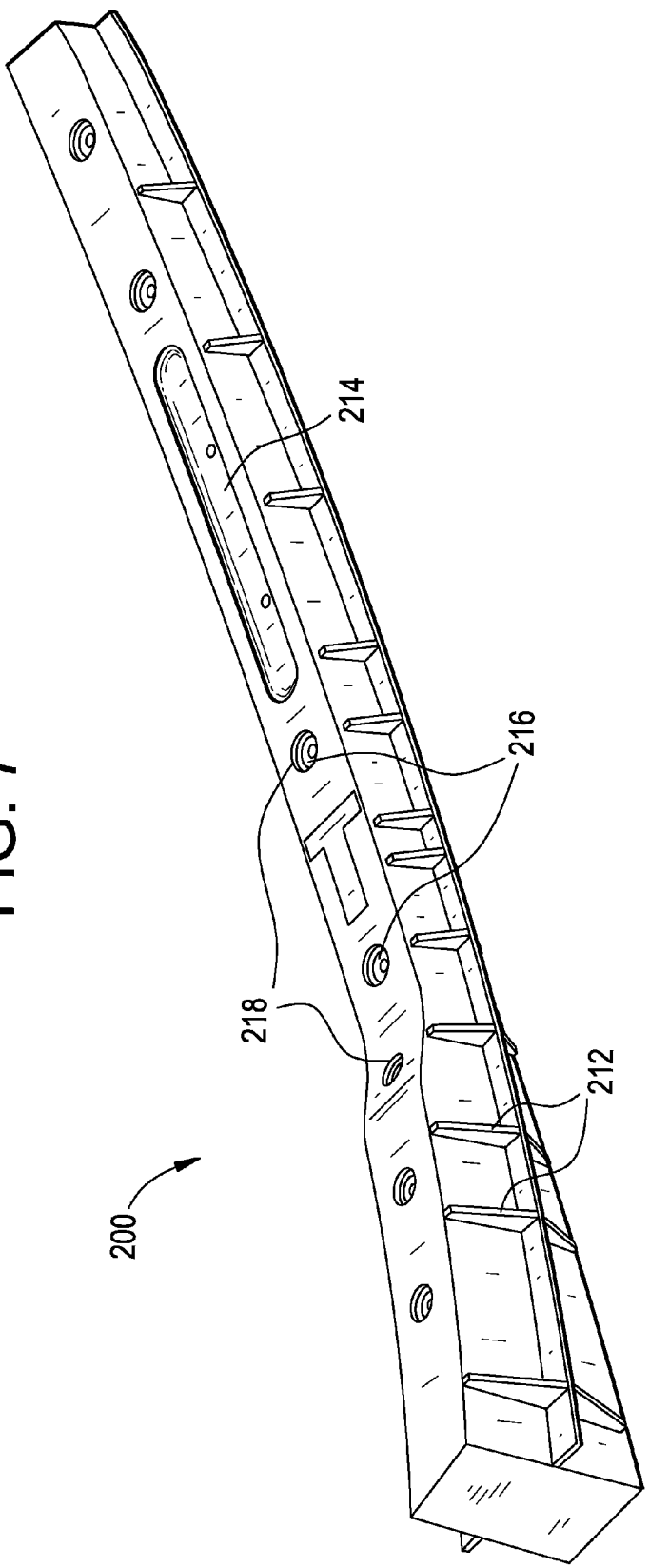
FIG. 7 is a bottom view of a crush countermeasure according to another embodiment of the present invention.
Figure 8:
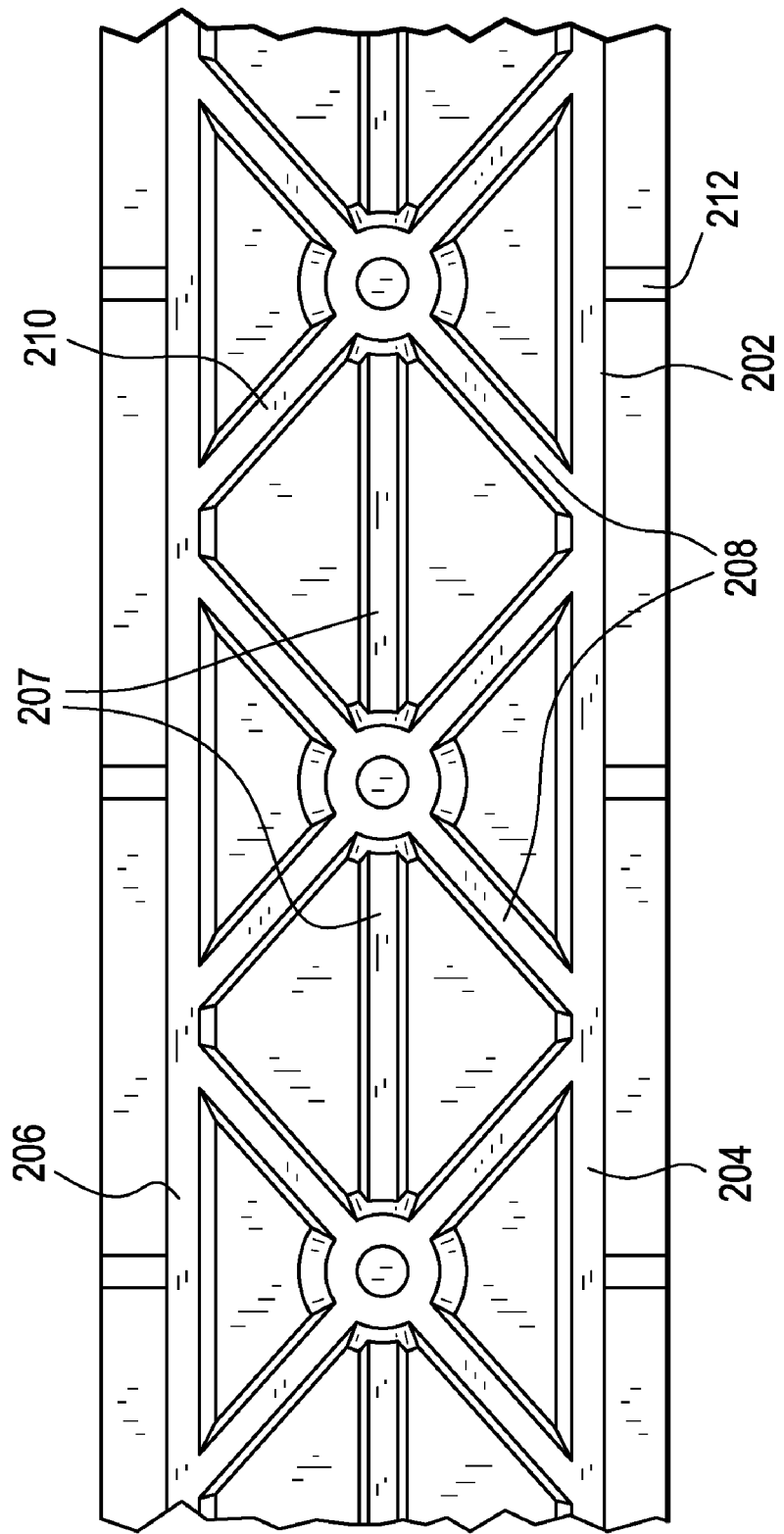
FIG. 8 is a close-up view of the plastic insert used in the crush countermeasure according to another embodiment of the present invention.

Lastly, FIG. 5 shows how the roof crush countermeasure 100 fits within a hollow space 120 in a motor vehicle. As can be seen the roof crush countermeasure 100 may be shaped such that it fits tightly within the hollow space 120 to provide reinforcement to the motor vehicle. In another embodiment, the roof crush countermeasure 100 may be placed alongside another structure to provide reinforcement rather than being inserted into a hollow space 120.

FIGS. 6-9 depict another embodiment of a roof crush countermeasure 200 according to the inventive aspects of the present invention. As may be seen in this embodiment, the roof crush countermeasure 200 also includes a plastic insert 202 that includes two longitudinal walls 204 and 206 that run substantially parallel along the length of the plastic insert 202. As with the alternative embodiment, between the longitudinal walls are located a plurality of reinforcing ribs 208, 210 that each extend between the longitudinal walls 204 and 206. The reinforcing ribs are, in this embodiment, shown as forming X-shaped internal reinforcing structures between the two longitudinal walls 204 and 206. The plastic insert 202 also includes a plurality of longitudinally extending reinforcement ribs 207 that provide further reinforcement to the plastic insert by helping to brace the ribs 208, 210.

The plastic insert 202 also includes a plurality of connecting ribs 212 that extend substantially transversally from each longitudinal wall 204, 206. As with the previous embodiment, the connecting ribs 212 are designed to help connect the plastic insert 202 to the reinforcing structure 214. As may be seen in FIG. 7, the plastic insert 202 may also use one or more projections 216 that can further help connect the plastic insert 202 to the reinforcing structure 214 using one or more holes 218 in the reinforcing structure 214.

Figure 9:
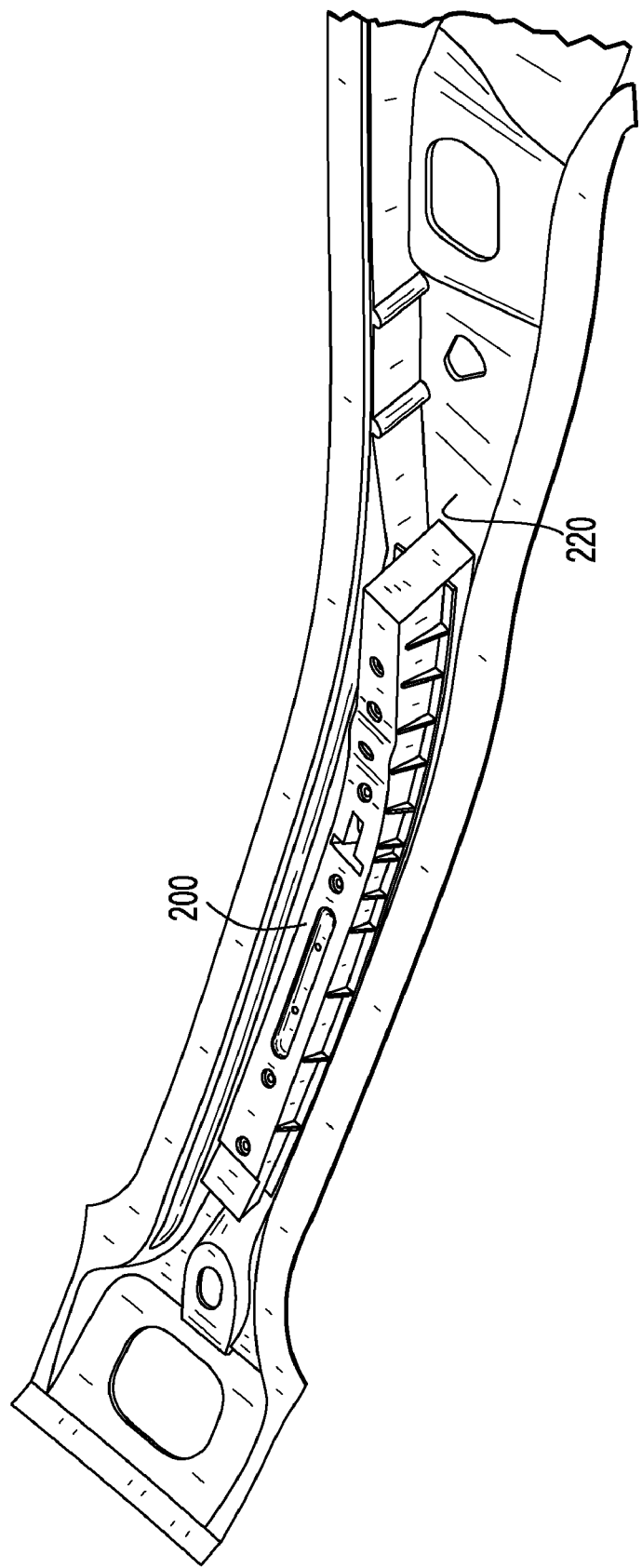
FIG. 9 is a perspective view of the crush countermeasure as used in a motor vehicle according to another embodiment of the present invention.

Lastly, FIG. 9 shows how the roof crush countermeasure 200 fits within a hollow space 220 in a motor vehicle. As can be seen the roof crush countermeasure 200 may be shaped to conform to the hollow space 220 to provide reinforcement to the motor vehicle.

The plastic insert used in the crush countermeasure may be formed using any method capable of forming a plastic insert. The method used may be chosen using one or more factors including, but not limited to, the materials used to form the plastic insert and/or the size of the plastic insert to be formed. Examples of methods that may be used in the present invention include, but are not limited to, extrusion molding, blow molding, compression molding, injection molding, melt molding (such as co-extrusion molding, T-die extrusion, inflation extrusion, profile extrusion, extrusion coating and multi-layer injection molding) or a combination including at least one of the foregoing methods.

The present invention may be used in any motor vehicle structure containing a hollow space to be reinforced or having a structure to be reinforced and wherein it is possible to place a crush countermeasure adjacent such a structure. While the present invention is disclosed specifically with respect to roof crush countermeasures, it is contemplated that the concepts of the present invention may be used to form plastic reinforcement structures that are used in other hollow areas of a motor vehicle that may beneficially utilize the lightweight impact characteristics offered by the reinforcement structures of the present invention.

While embodiments of the invention have been described, it would be understood by those skilled in the art that various changes may be made and equivalence may be substituted for the energy absorber or system thereof without departing from the scope of the invention. For example, although example embodiments discussed above pertain to specific attachment features additional attachment features are contemplated. In addition, many modifications may be made to adapt a particular situation of material to the teachings of the invention without departing from the essential scope thereof. For example, the various features of the body portion such as the variety of crush members can be combined with various designs and attachment features of the arm portion shown throughout the various examples. Therefore, it is intended that the invention not be limited to particular embodiments, but that the invention will include all embodiments falling within the scope of the pending claims.

We claim:
1. A plastic crush countermeasure comprising:
   a unitary plastic insert;
     wherein the plastic insert comprises:
        two longitudinal walls that are substantially parallel to one another and run substantially the length of the plastic crush countermeasure;

a plurality of reinforcement ribs connected at each end to each of the two longitudinal walls and wherein the plurality of reinforcement ribs form an internal X-shaped reinforcement structure;

a plurality of longitudinal reinforcement ribs dispersed between two or more reinforcement ribs and dispersed between the two longitudinal walls; and a plurality of connections for connecting the plastic insert to a reinforcing structure.

2. The plastic crush countermeasure of claim 1, further comprising the reinforcing structure attached to the plastic insert.

3. The plastic crush countermeasure of claim 2, wherein the reinforcing structure comprises a metal reinforcement.

4. The plastic crush countermeasure of claim 3, wherein the metal reinforcement comprises a steel stamping.

5. The plastic crush countermeasure of claim 1, wherein the plastic insert comprises a plastic material that is selected from acrylonitrile-butadiene-styrene, polycarbonate, polycarbonate/ABS blend, a copolycarbonate-polyester, acrylic-styrene-acrylonitrile, acrylonitrile-(ethylene-polypropylene diamine modified)-styrene, phenylene ether resins, blends of polyphenylene ether/polyamide, blends of polycarbonate/PET/PBT, polybutylene terephthalate, polyamides, phenylene sulfide resins, polyvinyl chloride, high impact polystyrene, low and/or high density polyethylene, polypropylene and thermoplastic olefins, and blends thereof.

6. The plastic crush countermeasure of claim 5, wherein the plastic material comprises a blend including polyphenylene ether and polyamide.

7. The plastic crush countermeasure of claim 2, wherein the plurality of connections comprise a plurality of connecting ribs that extend substantially transversally from each longitudinal walls and connect with openings in the reinforcing structure to secure the plastic insert to the reinforcing structure.

8. The plastic crush countermeasure of claim 2, wherein the plurality of connections comprise a plurality of connecting tabs located on a bottom of the plastic insert and connect with openings in the reinforcing structure to secure the plastic insert to the reinforcing structure.

9. A method of forming a plastic crush countermeasure comprising:
injection molding an entire plastic insert;
wherein the plastic insert comprises:
two longitudinal walls that are substantially parallel to one another and run substantially the length of the plastic crush countermeasure;
a plurality of reinforcement ribs connected at each end to each of the two longitudinal walls and wherein the plurality of reinforcement ribs form an internal X-shaped reinforcement structure;
a plurality of longitudinal reinforcement ribs dispersed between two or more reinforcement ribs and dispersed between the two longitudinal walls; and
a plurality of connections for connecting the plastic insert to a reinforcing structure.

10. The method of claim 9, further comprising the step of overmolding the reinforcing structure to the plastic insert.

11. The method of claim 10, wherein the reinforcing structure comprises a metal stamping.

12. The method of claim 11, wherein the metal stamping comprises a steel stamping.

13. The method of claim 9, wherein the plastic insert comprises a plastic material that is selected from acrylonitrile-butadiene-styrene, polycarbonate, polycarbonate/ABS blend, a copolycarbonate-polyester, acrylic-styrene-acrylonitrile, acrylonitrile-(ethylene-polypropylene diamine modified)-styrene, phenylene ether resins, blends of polyphenylene ether/polyamide, blends of polycarbonate/PET/PBT, polybutylene terephthalate, polyamides, phenylene sulfide resins, polyvinyl chloride, high impact polystyrene, low and/or high density polyethylene, polypropylene and thermoplastic olefins, and blends thereof.

14. The method of claim 13, wherein the plastic material comprises a blend including polyphenylene ether and polyamide.

15. The method of claim 10, wherein the plurality of connections comprise a plurality of connecting ribs that extend substantially transversally from each longitudinal walls and connect with openings in the reinforcing structure to secure the plastic insert to the reinforcing structure.

16. The method of claim 10, wherein the plurality of connections comprise a plurality of connecting tabs located on a bottom of the plastic insert and connect with openings in the reinforcing structure to secure the plastic insert to the reinforcing structure.

17. A plastic crush countermeasure comprising:
a plastic reinforcing structure; and
a unitary plastic insert attached to the plastic reinforcing structure, wherein the plastic insert comprises
two longitudinal walls that are substantially parallel to one another and run substantially the length of the plastic crush countermeasure;
a plurality of reinforcement ribs connected at each end to each of the two longitudinal walls and wherein the plurality of reinforcement ribs form an internal X-shaped reinforcement structure;
a plurality of longitudinal reinforcement ribs dispersed between two or more reinforcement ribs and dispersed between the two longitudinal walls; and
a plurality of connections for connecting the plastic insert to the plastic reinforcing Structure.

\* \* \* \* \*